US012785782B2

(12) United States Patent
Koskela et al.

(10) Patent No.: US 12,785,782 B2
(45) Date of Patent: Nov. 3, 2026

(54) DETERMINING BEAM FAILURE DETECTION REFERENCE SIGNALS IN INTER-CELL MULTI-DOWNLINK CONTROL INFORMATION MULTI-TRANSMISSION RECEPTION POINT

(71) Applicant: Nokia Technologies Oy, Espoo (FI)

(72) Inventors: Timo Koskela, Oulu (FI); Sami-Jukka Hakola, Kempele (FI); Juha Karjalainen, Sotkamo (FI); Keeth Saliya Jayasinghe Laddu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 629 days.

(21) Appl. No.: 17/799,205

(22) PCT Filed: Feb. 18, 2021

(86) PCT No.: PCT/FI2021/050114

§ 371 (c)(1),
(2) Date: Aug. 11, 2022

(87) PCT Pub. No.: WO2021/214377

PCT Pub. Date: Oct. 28, 2021

(65) Prior Publication Data

US 2023/0163914 A1 May 25, 2023

Related U.S. Application Data

(60) Provisional application No. 63/013,399, filed on Apr. 21, 2020.

(51) Int. Cl.

| | |
|---|---|
| ***H04B 7/06*** | (2006.01) |
| ***H04L 5/00*** | (2006.01) |
| ***H04W 24/08*** | (2009.01) |

(52) U.S. Cl.
CPC ....... *H04B 7/06964* (2023.05); *H04L 5/0051* (2013.01); *H04L 5/0053* (2013.01); *H04W 24/08* (2013.01)

(58) Field of Classification Search
CPC ... H04L 5/0051; H04L 5/0053; H04L 5/0048; H04L 5/0023; H04W 24/08; H04B 7/0695; H04B 7/0694; H04B 7/06964
See application file for complete search history.

(56) References Cited

U.S. PATENT DOCUMENTS

2019/0173740 A1 6/2019 Zhang et al.
2019/0230545 A1 7/2019 Liou et al.

(Continued)

FOREIGN PATENT DOCUMENTS

CN 110062397 A 7/2019
CN 110312276 A 10/2019

(Continued)

OTHER PUBLICATIONS

"New WID: Further enhancements on MIMO for NR", 3GPP TSG RAN Meeting #86, RP-193133, Agenda: 9.1.1, Samsung, Dec. 9-12, 2019, 5 pages.

(Continued)

*Primary Examiner* — Kwang B Yao
*Assistant Examiner* — Patrick Yipao Pei
(74) *Attorney, Agent, or Firm* — SQUIRE PATTON BOGGS (US) LLP

(57) ABSTRACT

According to certain embodiments, an apparatus and method may include receiving, by a user equipment, at least one set of periodic channel state information reference signal (CSI-RS) resource configuration index from at least one network entity (201), determining at least one predetermined index not received from the at least one network entity (203), determining at least one set of periodic CSI-RS resource (Continued)

configuration indexes with same values as the RS indexes in the RS sets (205), and performing at least one beam failure detection procedure (207).

16 Claims, 4 Drawing Sheets

(56) References Cited

U.S. PATENT DOCUMENTS

| | | | | |
|---|---|---|---|---|
| 2019/0273637 | A1* | 9/2019 | Zhang | H04L 5/0094 |
| 2019/0306765 | A1 | 10/2019 | Cirik et al. | |
| 2019/0320333 | A1 | 10/2019 | Koskela et al. | |
| 2020/0007678 | A1 | 1/2020 | Zhou et al. | |
| 2020/0044723 | A1 | 2/2020 | Cirik et al. | |
| 2020/0260300 | A1* | 8/2020 | Cirik | H04B 7/088 |
| 2020/0314860 | A1* | 10/2020 | Zhou | H04W 72/23 |
| 2022/0140954 | A1* | 5/2022 | Kim | H04L 1/1861 370/329 |
| 2022/0311577 | A1* | 9/2022 | Matsumura | H04L 5/0053 |
| 2022/0377775 | A1* | 11/2022 | Zhang | H04L 5/0044 |
| 2023/0028423 | A1* | 1/2023 | Xu | H04B 7/0408 |

FOREIGN PATENT DOCUMENTS

| | | | |
|---|---|---|---|
| EP | 3627721 | A1 | 3/2020 |
| WO | 2019/215389 | A2 | 11/2019 |
| WO | 2020/012619 | A1 | 1/2020 |

OTHER PUBLICATIONS

"Feature Summary of Enhancements on Multi-TRP/Panel Transmission", 3GPP TSG RAN WG1 Meeting #98bis, R1-1911425, Agenda: 7.2.8.2, Huawei, Oct. 14-20, 2019, 100 pages.

"3rd Generation Partnership Project; Technical Specification Group Radio Access Network; NR; Physical layer procedures for data (Release 16)", 3GPP TS 38.214, V16.0.0, Dec. 2019, pp. 1-148.

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

"3rd Generation Partnership Project; Technical Specification Group Radio Access Network; NR; Requirements for support of radio resource management (Release 16)", 3GPP TS 38.133, V16.2.0, Dec. 2019, 1130 pages.

International Search Report and Written Opinion received for corresponding Patent Cooperation Treaty Application No. PCT/FI2021/050114, dated May 12, 2021, 17 pages.

"3rd Generation Partnership Project; Technical Specification Group Radio Access Network; NR; Physical layer procedures for control (Release 16)", 3GPP TS 38.213, V16.1.0, Mar. 2020, pp. 1-156.

"Summary on UE features for eMIMO", 3GPP TSG RAN WG1 #100bis, R1-2001868, Agenda: 7.2.11.6, Moderator (AT&T), Apr. 20-30, 2020, 75 pages.

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.

Extended European Search Report received for corresponding European Patent Application No. 21792363.0, dated Apr. 4, 2023, 10 pages.

Office action received for corresponding Chinese Patent Application No. 202180022929.2, dated Aug. 17, 2023, 9 pages of office action and no page of translation available.

Notice of Allowance received for corresponding Chinese Patent Application No. 202180022929.2, dated Apr. 1, 2024, 5 pages of Notice of Allowance and no page of translation available.

"On the Remaining Issues for SCell Beam Failure Recovery RRM Requirement", 3GPP TSG-RAN WG4 Meeting #94-e, R4-2000289, Agenda: 8.11.2.2, Samsung, Feb. 24-Mar. 6, 2020, pp. 1-7.

Cheng et al., "Design and implementation of beam failure recovery in 5G", Application of Electronic Technique, vol. 44, No. 9, 2018, 4 pages.

Office action received for corresponding Vietnamese Patent Application No. 1-2022-06064, dated Sep. 6, 2024, 2 pages of office action and 2 pages of translation available.

Indonesia Office Action, with English language translation, corresponding to ID Application No. P00202210503, dated May 20, 2025.

* cited by examiner

DETERMINING BEAM FAILURE DETECTION REFERENCE SIGNALS IN INTER-CELL MULTI-DOWNLINK CONTROL INFORMATION MULTI-TRANSMISSION RECEPTION POINT

RELATED APPLICATION

This application was originally filed as PCT Application No. PCT/FI2021/050114 on Feb. 18, 2021, which claims priority from U.S. Application No. 63/013,399, filed on Apr. 21, 2020, each of which is incorporated herein by reference in its entirety.

TECHNICAL FIELD

Some example embodiments may generally relate to mobile or wireless telecommunication systems, such as Long Term Evolution (LTE) radio access technology (RAT), fifth generation (5G) RAT, new radio (NR) access technology, or other communications systems. For example, certain embodiments may relate to systems and/or methods for inter-cell multi-transmission reception point (TRP) operation and related beam management procedures.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, 5G RAT, and/or NR access technology. 5G wireless systems refer to the next generation (NG) of radio systems and network architecture. A 5G system may be mostly built on a 5G NR, but a 5G (or NG) network can also build on an E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity, and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN, or the evolved NB (eNB) in LTE) may be named next-generation NB (gNB) when built on NR radio, and may be named next-generation eNB (NG-eNB) when built on E-UTRA radio.

SUMMARY

In accordance with some embodiments, a method may include receiving, by a user equipment, at least one set of periodic channel state information reference signal resource configuration indexes from at least one network entity. The method may further include determining, by the user equipment, at least one set of failure detection resources. The at least one failure detection resource may include at least one indication of at least one transmission configuration indication state indicating at least one reference signal index by the transmission configuration indication state for at least one respective control resource set. At least one failure detection resource index may comprise at least one indication of at least one transmission configuration indication state indicating at least one respective control resource set associated with a higher layer parameter.

In accordance with certain embodiments, an apparatus may include means for receiving at least one set of periodic channel state information reference signal resource configuration indexes from at least one network entity. The apparatus may further include means for determining at least one set of failure detection resources. The at least one failure detection resource may include at least one indication of at least one transmission configuration indication state indicating at least one reference signal index by the transmission configuration indication state for at least one respective control resource set. At least one failure detection resource index may comprise at least one indication of at least one transmission configuration indication state indicating at least one respective control resource set associated with a higher layer parameter.

In accordance with various embodiments, an apparatus may include at least one processor and at least one memory including computer program code. The at least one memory and the computer program code may be configured to, with the at least one processor, cause the apparatus to at least receive at least one set of periodic channel state information reference signal resource configuration indexes from at least one network entity. The at least one memory and the computer program code may be further configured to, with the at least one processor, cause the apparatus to at least determine at least one set of failure detection resources. The at least one failure detection resource may include at least one indication of at least one transmission configuration indication state indicating at least one reference signal index by the transmission configuration indication state for at least one respective control resource set. At least one failure detection resource index may comprise at least one indication of at least one transmission configuration indication state indicating at least one respective control resource set associated with a higher layer parameter.

In accordance with some embodiments, a non-transitory computer readable medium may be encoded with instructions that may, when executed in hardware, perform a method. The method may include receiving at least one set of periodic channel state information reference signal resource configuration indexes from at least one network entity. The method may further include determining at least one set of failure detection resources. The at least one failure detection resource may include at least one indication of at least one transmission configuration indication state indicating at least one reference signal index by the transmission configuration indication state for at least one respective control resource set. At least one failure detection resource index may comprise at least one indication of at least one transmission configuration indication state indicating at least one respective control resource set associated with a higher layer parameter.

In accordance with certain embodiments, a computer program product may perform a method. The method may include receiving at least one set of periodic channel state information reference signal resource configuration indexes from at least one network entity. The method may further include determining at least one set of failure detection resources. The at least one failure detection resource may include at least one indication of at least one transmission configuration indication state indicating at least one reference signal index by the transmission configuration indication state for at least one respective control resource set. At least one failure detection resource index may comprise at least one indication of at least one transmission configuration indication state indicating at least one respective control resource set associated with a higher layer parameter.

In accordance with various embodiments, an apparatus may include circuitry configured to receive at least one set of periodic channel state information reference signal resource configuration indexes from at least one network entity. The circuitry may further be configured to determine at least one set of failure detection resources. The at least one failure detection resource may include at least one indication of at least one transmission configuration indication state indicating at least one reference signal index by the transmission configuration indication state for at least one respective control resource set. At least one failure detection resource index may comprise at least one indication of at least one transmission configuration indication state indicating at least one respective control resource set associated with a higher layer parameter.

BRIEF DESCRIPTION OF THE DRAWINGS

For proper understanding of example embodiments, reference should be made to the accompanying drawings, wherein.

DETAILED DESCRIPTION

Figure 1:
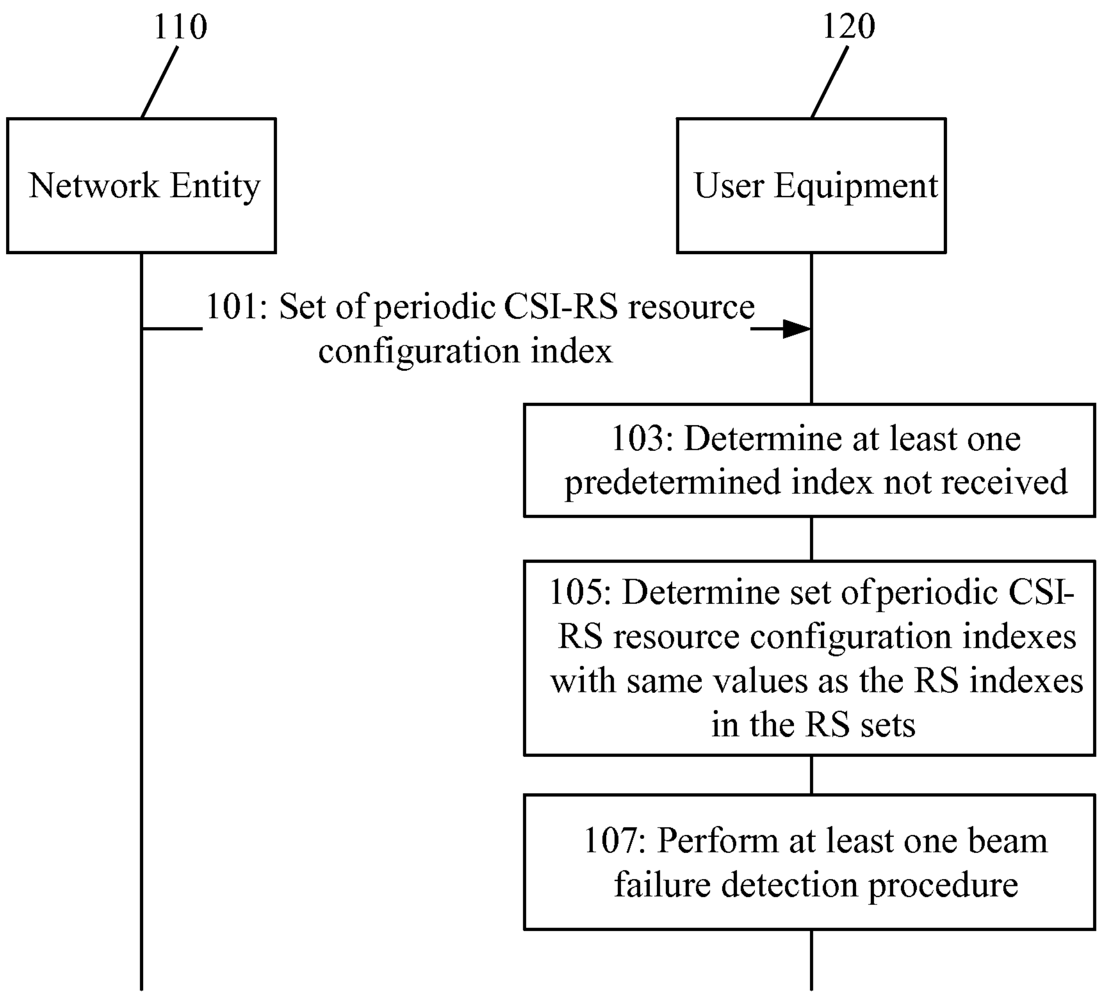
FIG. 1 illustrates an example of a signaling diagram according to certain embodiments.

Third Generation Partnership Project (3GPP) NR work item (WI) RP-193133 has several objectives to support inter-cell multi-TRP operation and enhance intra-cell multi-TRP. For example, features may be identified and specified which improve reliability and robustness for physical downlink control channel (PDCCH), physical uplink shared channel (PUSCH), and physical uplink control channel (PUCCH) using multi-TRP and/or multi-panel, based on release (Rel)-16 reliability features as the baseline. In addition, quasi co-location (QCL)/transmission configuration indication (TCI)-related enhancements may also be identified which enable inter-cell multi-TRP operations, assuming multi-downlink control information (DCI)-based multi-physical downlink shared channel (PDSCH) reception. Beam-management-related enhancements may also be included for simultaneous multi-TRP transmission with multi-panel reception, as well as support for high speed train (HST)-system frame number (SFN) deployment scenarios. Finally, enhancements may be included with respect to QCL assumptions for demodulation reference signals (DMRS), such as multiple QCL assumptions for the same DMRS ports and/or targeting downlink (DL)-only transmissions.

In 3GPP Rel-15, user equipment may be configured with up to 3 control resource sets (CORESETs), while in Rel-16, multi-DCI based multi-TRP designs permit a maximum number of 5 CORESETs with active TCI states for PDCCH. And to further support multi-DCI based multi-TRP operations, a higher layer parameter, CORESETPoolIndex, was defined.

3GPP technical report (TR) 38.213 notes that a user equipment (UE) may be configured with up to 2 CORESETPoolIndex values: 0 and 1. For example, for each DL bandwidth part (BWP) configured to a UE in a serving cell, the UE may be provided via higher layer signalling with no more than 3 CORESETs if CORESETPoolIndex is not provided, or if a value of CORESETPoolIndex is same for all CORESETs if CORESETPoolIndex is provided. Alternatively, no more than 5 CORESETs may be configured in the UE if CORESETPoolIndex is not provided for a first CORESET, or is provided and has a value 0 for a first CORESET and has a value 1 for a second CORESET.

Further agreement was reached to support multiple-PDCCH based multi-TRP/panel transmission with intra-cell (same cell ID) and inter-cell (different cell IDs), wherein radio resource control (RRC) configuration may be used to link multiple PDCCH/PDSCH pairs with multiple TRPs. One CORESET in a PDCCH-config may correspond to one TRP, but further may occur as to whether to increase the number of CORESETs per PDCCH-config to more than 3.

In NR, the beam failure detection may based on the estimated or hypothetical block error rate of the PDCCH. To estimate this failure, the UE may determine the block error rate using measurements on at least one beam failure detection reference signal (BFD-RS), as well as predefined parameter sets. The BFD-RS may be configured for the UE in an explicit or implicit manner. When explicitly configured, the network may provide the UE with at least one CSI-RS index configured for failure detection. For implicit configuration, the UE may determine the BFD-RS itself based on the activated TCI states for PDCCH; for example, the UE may use the periodic CSI-RS indexes indicated by the TCI state.

3GPP TS 38.213 describes that a UE may be provided, for each BWP of a serving cell, a set $\overline{q}_0$ of periodic CSI-RS resource configuration indexes by failureDetectionResources or beamFailureDetectionResourceList and a set $\overline{q}_1$ of periodic CSI-RS resource configuration indexes and/or SS/PBCH block indexes by candidateBeamRSList or candidateBeamResourceList for radio link quality measurements on the BWP of the serving cell. If the UE is not provided $\overline{q}_0$ by failureDetectionResources or beamFailureDetectionResourceList for a BWP of the serving cell, the UE may determine the set $\overline{q}_0$ to include periodic CSI-RS resource configuration indexes with same values as the RS indexes in the RS sets indicated by TCI-State for respective CORESETs that the UE uses for monitoring PDCCH. Similarly, if there are two RS indexes in a TCI state, the set $\overline{q}_0$ may include RS indexes with QCL-TypeD configuration for the corresponding TCI states. The UE may expect the set $\overline{q}_0$ to include up to two RS indexes, and a single port RS in the set do.

In 3GPP Rel-15 and currently in Rel-16, the number of BFD-RS was not permitted to be more than 2, which is the maximum number of BFD-RS per BWP. The set of BFD-RS (set of $\overline{q}_0$) is configured for particular BWPs. For example, in one BWP, the UE may be configured with only 2 CORESETs, and, using implicit BFD-RS configurations, the UE may determine the BFD-RS according to the active TCI states for the CORESET (i.e., the UE can select which RS indicated by the TCI state the UE should monitor for failure detection). As a further example for other BWPs, the UE may be configured with more than 2 CORESETs (NR supports up to five due to the multi-TRP addition in Rel-16);

thus, in implicit BFD-RS configuration, the selection mechanism/rule allows the UE to monitor up to two RSs indicated by the TCI states for the configured CORESETs.

Two reference signals may share the same properties indicated by the QCL type when the network indicates two RS are to be quasi co-located. As an example, when reference signals are quasi co-located with value 'typeD,' this may indicate to the UE that the UE may receive both reference signals using the same spatial RS filter, such as using the same RX beam. With respect to QCL, in 3GPP TS 38.214, the quasi co-location types corresponding to each DL RS may be given by the higher layer parameter qcl-Type in QCL-Info and may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; and 'QCL-TypeD': {Spatial Rx parameter}.

In 3GPP Rel-15, the maximum number of beam failure detection resources per BWP may be limited to two, where the UE expects the set $\overline{q}_0$ to include up to two RS indexes. The UE may select the BFD-RS resources when the number of CORESETs with active TCI states for PDCCH is more than the maximum number of BFD-RS, such as when no selection mechanism is defined for beam failure detection. Although the maximum number of configured CORESETs was increased to five in 3GPP Rel-16, for multi-DCI based multi-TRP operation, the number of BFD-RS was not increased above two. Based on the existing support for intra-cell multi-TRP operation, the selection mechanism remains control by the UE. However, the maximum number of BFD-RS may eventually be increased, but would still require a selection mechanism. Currently, the inter-cell multi-TRP or the multi-TRP operation in general is not considered during beam failure detection as an implicit beam failure detection reference signal configuration. Certain techniques described herein propose BFD-RS selection rules to address this shortcoming. Although described as certain examples throughout, any techniques discussed herein may be applied for multi-TRP, intra-cell multi-TRP, inter-cell multi-TRP scenario, beam failure detection, and/or radio link monitoring. For example, in radio link monitoring, such as using the RLM-RS, radio link monitoring reference signals, as well as for beam failure detection, both explicit and implicit configuration of failure detection resources may be applied. The use of BFD-RS and RLM-RS may be used interchangeably in any of the embodiments, and may be simply referred to as failure detection resources.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for intra-cell multi-TRP and inter-cell multi-TRP operation and related beam management is not intended to limit the scope of certain embodiments, but is instead representative of selected example embodiments.

Certain embodiments may have various benefits and/or advantages. For example, certain embodiments may permit expanded support of intra-cell multi-TRP operations. Thus, certain embodiments are directed to improvements in computer-related technology.

FIG. 1 illustrates an example of a system according to certain embodiments. A system may include one or more of at least one network entity 110, which may be similar to NE 310 in FIG. 3, and user equipment 120, which may be similar to UE 320 in FIG. 3. At 101, NE 110 may transmit to UE 120, for each BWP of NE 110, one or more of at least one set $\overline{q}_0$ of periodic CSI-RS resource configuration indexes by failureDetectionResources (in RRC RadioLinkMonitoringConfig IE) or beamFailureDetectionResourceList; at least one set $\overline{q}_1$ of periodic CSI-RS resource configuration indexes; and at least one SS/PBCH block index by candidateBeamRSList or candidateBeamResourceList configured for radio link quality measurements on the BWP of NE 110. At 103, UE 120 may determine that at least one predetermined index was not received from NE 110.

At 105, UE 120 may determine at least one set $\overline{q}_0$ to include at least one periodic CSI-RS resource configuration index with at least one same value as the at least one RS index in the at least one RS set indicated by TCI-state for respective CORESETs that UE 120 uses for monitoring PDCCH. In some embodiments, UE 120 may perform this determination upon determining that UE 120 was not provided $\overline{q}_0$ by failureDetectionResources or beamFailureDetectionResourceList for a BWP of NE 110. In various embodiments, if there are two RS indexes in a TCI state, the set $\overline{q}_0$ may include at least one RS index with QCL-TypeD configuration for at least one corresponding TCI state. UE 120 may expect the at least one set $\overline{q}_0$ to comprise up to two RS indexes, and may expect a single port RS in the set $\overline{q}_0$. In various embodiments, SS/PBCH block (SSB) and/or CSI-RS indices may be used for failure detection (beam failure detection and/or radio link monitoring); for example, failure detection resources may include both resource types or only single resource type (SSB/CSI-RS).

In various embodiments, if UE 120 does not receive set $\overline{q}_0$ byfailureDetectionResources or beamFailureDetectionResourceList for a BWP of NE 110, and UE 120 is configured with CORESETPoolIndex, UE 120 may include into set $\overline{q}_0$ one or more of at least one periodic CSI-RS resource index, indicated by at least one TCI state; and at least one indication of at least one RS index by the TCI state for at least one CORESET respective with at least one QCL source RS indicating at least one PCI value other than the PCI of the serving cell with active DL BWP.

In various embodiments, UE 120 may include into set $\overline{q}_0$ one or more of at least one failure detection resource index, indicated by at least one TCI state; for at least one CORESET respective with at least one QCL source RS indicating at least one PCI value other than the PCI of the serving cell with active DL BWP. In various embodiments, UE 120 may determine to include to the set of $\overline{q}_0$ at least one BFD-RS per each TRP or per each cell configured for multi-TRP communication.

In various embodiments, UE 120 may include into set $\overline{q}_0$ one or more of at least one failure detection resource index, indicated by at least one TCI state; for at least one CORESET indicating that the CORESET is received from another cell other than the current serving cell. As an example, the serving cell may refer to the cell index or physical cell index of the cell with currently active BWP. Another cell, the non-serving cell, the adjacent cell, the neighbour cell, and/or the cell participating to inter-cell m-TRP may be configured to serve UE 120 using the serving cell configuration. For example, the serving cell configuration (e.g., pdcch-config) may include at least one parameter or configuration for receiving data/control from the non-serving cell, which may be referred as inter-cell multi-TRP. In some embodiments, the configuration may be specific for the inter-cell multi-TRP and/or may not be part of the serving cell configuration, although it may be provided by the serving cell.

In various embodiments, the multi-TRP operation, intra-cell, and/or inter-cell may be referenced using the CORE- SETPoolIndex. In some examples, the CORESETs with same CORESETPoolIndex values may be considered by UE 120 to be transmitted from the same TRP. For example, if UE 120 has more than one different CORESETPoolIndex value configured, then UE 120 may be configured with multi-TRP communication. Additionally or alternatively, CORESETs associated with CORESETPoolIndex may be further associated to another-cell/non-serving cell, such as a cell not configured as serving cell, to facilitate inter-cell M-TRP. An association may be indicated explicitly that CORESETs within a pool are associated to a specific cell, for example, the adjacent cell. In various examples, in the CORESETPoolIndex configuration, the index may be associated with a PCI or other identifier configured for the same purpose.

In various embodiments, determining that the CORESET and/or an RS indicated by the TCI state is transmitted from another cell (or from the non-serving cell participating to multi-TRP transmission/reception) and/or that UE 120 is configured with at least one inter-cell M-TRP may based upon one or more of:

- the QCL source of the indicated RS by at least one TCI state may be configured to be transmitted from cell other than the current serving cell. For example, if the source RS is SSB/CSI-RS, NE 110 may configure at least one SSB index to be associated with at least one cell identifier, such as PCI
- at least one CORESET may be transmitted from another cell RS, such as where the CORESET has at least one indication, such PCI, or is associated with any signal configured to be transmitted from other cell, is, such as through configuration, associated with at least one other cell. For example, at least one PDCCH and/or PDSCH reception may be configured from at least one other cell with at least one PCI value other than the PCI of the serving cell with at least one active DL BWP
- at least one entry in the TCI state list and/or at least one activated TCI state may be associated with at least one non-serving cell.
- Any indication that PDCCH configuration (including CORESET configuration) or reference signal configuration or PDCCH reception is from another cell than current serving cell. In some embodiments, at least one explicit indication may be provided as part of the configuration.

In some embodiments, the at least one another cell/neighbour cell/adjacent cell/non-serving cell and/or at least one cell participating in at least one serving cell for UE 120. For example, at least one configuration may be a special configuration, where UE 120 may receive at least one indication that NE 110 may not be a secondary cell (SCell), but instead configured for multi-TRP. In various embodiments, at least one inter cell m-TRP cell may be an SCell.

In some embodiments, the inter-cell m-TRP may be configured for UE 120 by means of BWP configuration; for example, the cell providing m-TRP connectivity in addition for current serving cell (e.g. PCell) may be configured as additional BWP for NE 110 for m-TRP purposes.

In some embodiments, if UE 120 is not provided $\overline{q}_0$ by failureDetectionResources or beamFailureDetectionResourceList for a BWP of NE 110, and UE 120 is configured with CORESETPoolIndex, for each CORESETPoolIndex, UE 120 may include into set $\overline{q}_0$ at least one periodic CSI-RS resource index, indicated by the TCI state for at least one respective CORESET associated with CORESETPoolIndex. In certain embodiments, when UE 120 is configured with more than one CORESETPoolIndex, UE 120 may not include into set $\overline{q}_0$ more than 'N_lr_max−1' RSs indicated by the TCI state for the CORESETs for the respective CORESETPoolIndex.

In various embodiments, UE 120 may not include into set $\overline{q}_0$ more than 'N_lr_max−1' RSs indicated by the TCI state for the CORESETs for the respective CORESETPoolIndex where N_lr_max may refer to a maximum number of failure detection resources per TRPICORESETpoolIndex or BWP.

In certain embodiments, for inter-cell operations when the set of $\overline{q}_0$ cannot accommodate all the RS corresponding to the active TCI states for PDCCH, UE 120 may select at least one resource to be included in the set of $\overline{q}_0$ so that the QCL source of different RS QCL info with the same PCI with each other.

In one embodiment, UE 120 may be restricted to select at least one but at most N (that can be also 1) BFD-RS indicated by the TCI state for the CORESETs associated with specific CORESETpoolIndex #1 and determined rest of the BFD-RS based on the active TCI states for CORESETs in the CORESETPoolIndex "#0". This may be applied when a CORESETpoolIndex is associated with TRP other than current serving cell PCI.

In some embodiments, for the implicit determination of BFD-RS, NE 110 may indicate per CORESET or CORESETPoolIndex (TRP), whether UE 120 shall consider the RS associated with the activated TCI state for determining BFD-RS. For example, NE 110 may configure in the at least one CORESET configuration that, in the implicit configuration of BFD-RS (or a failure detection resource), the periodic CSI-RS indicated by the active TCI state for PDCCH associated with the CORESET may not be included in the set of $q_0$. The set of $q_0$ may be cell specific (e.g., in inter-cell m-TRP, where the inter-cell m-TRP may be facilitated using at least one CORESET in a CORESETPoolIndex associated with at least one other cell than NE 110) or TRP specific (CORESETPoolIndex value specific). In some embodiments, at least one CORESETPoolIndex value '0' may have its respective set of $q_0$_0, wherein at least one RS index included in the set of $q_0$_0 may be determined based on the active TCI states for the respective CORESETs associated with the pool index, while CORESETPoolIndex value '1' may have the set of $q_0$_1. For example, different sets may be applied regardless of whether the CORESETs in CORESETPoolIndex are associated with one or more cells. In some examples, at least one CORESETPoolIndex may have respective sets of $q_0$ if both configured for the same cell and/or if they are configured or associated with different cells (e.g., in inter-cell m-TRP).

In various examples, the RS of the respective CORESET may only be included if the number of CORESETs is the equal to or less than $N_{max}$ (max number of BFD-RS). In certain embodiments, the maximum number of BFD-RS may be per BWP, per CORESETPoolIndex, or per cell when a cell is associated with a CORESETPoolIndex. Additionally or alternatively, NE 110 may indicate in a new field of the CORESET configuration the priority of each CORESET; for example, when UE 120 determines the BFD-RS, it may use the priority value to select which RS indicated by the active TCI states for PDCCH UE 120 will include in the set of $q_0$. In some example embodiments, UE 120 may first select at least one BFD-RS per CORESETPoolIndex and then determine the remaining BFD-RS according to priority. In certain embodiments, UE 120 may determine at least one BFD-RS according to the priority value (e.g., an index may be used and UE 120 may be configured to select starting from the lowest value or the highest value or the value that indicates highest priority).

In one embodiment, in the implicit determination of the BFD-RS, the RS QCLed with the TCI state of the CORESET #0 is prioritized over the others.

In some embodiments, similar rules may be applied in general for failure detection, e.g. for RLM. According to various embodiments, UE 120 may perform at least one implicit determination of the BFD-RS in a manner that in multi-TRP communication (intra or inter cell), UE 120 may select at least one BFD-RS per CORESETPoolIndex (or other identifier identifying a TRP or is associated with a TRP). Additionally or alternatively, if UE 120 has selected at least one BFD-RS per TRP, UE 120 may select at least one additional BFD-RS resource that is determined by the TCI state for the at least one CORESET in the CORESETPoolIndex '0' or CORESETPoolIndex that has the CORESET #0 configured. In some embodiments, UE 120 may select one BFD-RS, first per each cell and then further select at least one additional BFD-RS from the serving cell.

In some embodiment, at least one failure detection resource (e.g., a set of $q_0$) may be determined per cell in inter-cell multi-TRP. For example, in case the set of $q_0$ (the failure detection resources) are determined per cell in inter-cell multi-TRP (where CORESET(s) of at least one CORESETPoolIndex are transmitted (or associated) from the non-serving cell/cell-participating to the m-TRP), UE 120 may determine that it should select per cell, at least one BFD-RS for each CORESETPoolIndex. For example, if UE 120 can be configured with 4 CORESETPoolIndexes (i.e., 4 TRPs would be used), two indexes (0,1) are associated with cell 1, and two indices (2,3) are associated with cell 2, UE 120 may determine to select for cell 1 at least one per CORESETPoolIndex (0,1) and for cell 2, at least one per CORESETPoolIndex of the respective cell (2,3).

In various embodiments, thresholds $Q_{out,LR}$ and $Q_{in,LR}$ may correspond to various default values of, as described in 3GPP TS 38.133, rlmInSyncOutOfSyncThreshold for $Q_{out}$, and to the values provided by rsrp-ThresholdSSB or rsrp-ThresholdSSBBFR, respectively.

The physical layer in UE 120 may assess the radio link quality according to the set $q_0$ of resource configurations against the threshold $Q_{out,LR}$. For set $q_0$, UE 120 may assess the radio link quality only according to periodic CSI-RS resource configurations, or SS/PBCH blocks on the PCell or the PSCell, that are quasi co-located, with the DMRS of PDCCH receptions monitored by UE 120. UE 120 may apply threshold $Q_{in,LR}$ to at least one L1-RSRP measurement obtained from at least one SS/PBCH block. Additionally or alternatively, UE 120 may apply threshold $Q_{in,LR}$ to at least one L1-RSRP measurement obtained for at least one CSI-RS resource after scaling a respective CSI-RS reception power with a value provided by powerControlOffsetSS.

In various embodiments, where multiple rules are defined, when selecting BFD-RS, UE is 120 may use at least one rule configured by NE 110, and/or at least one rule selected by UE 120. Furthermore, these configuration rules may be signaled to UE 120, for example, using RRC signalling. At 107, UE 120 may perform at least one beam failure detection procedure.

Figure 2:
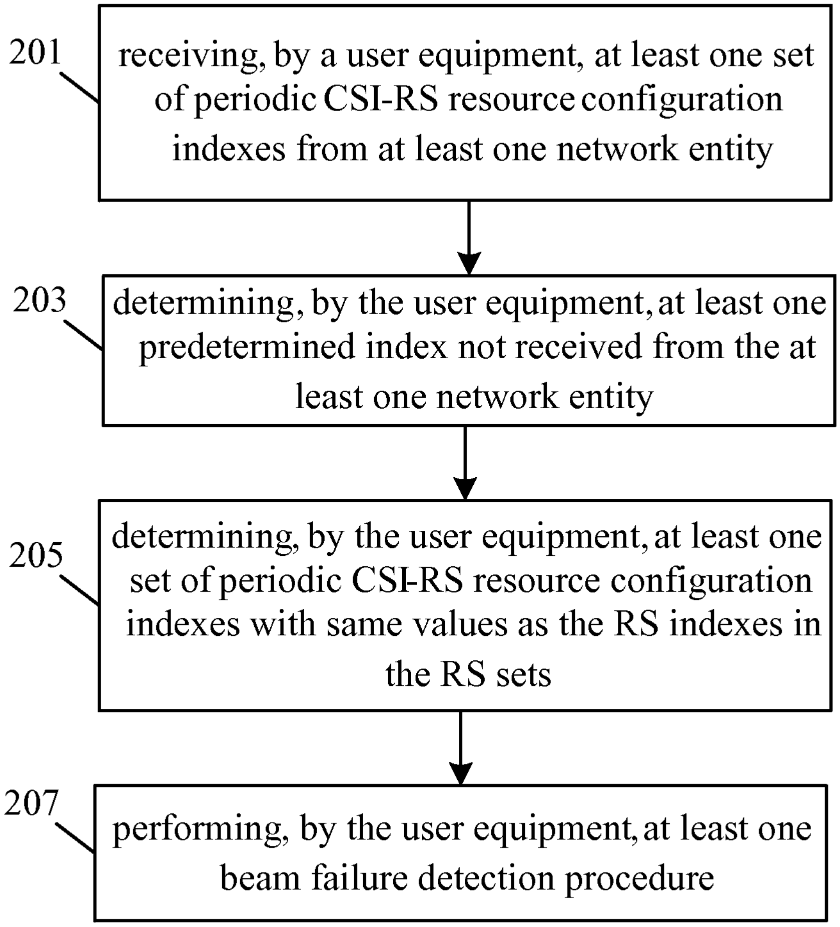
FIG. 2 illustrates an example of a flow diagram of a method according to some embodiments.
Figure 3:
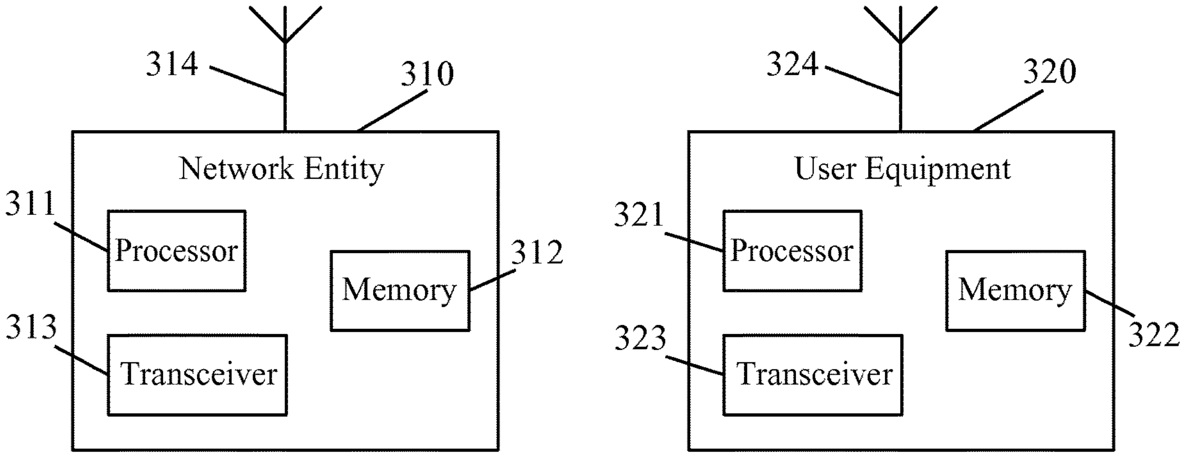
FIG. 3 illustrates an example of various network devices according to various embodiments.

FIG. 2 illustrates an example of a flow diagram of a method that may be performed by a UE, such as UE 320 illustrated in FIG. 3, according to certain embodiments.

At 201, the UE may receive from an NE, such as NE 310 in FIG. 3, for each BWP of the NE, one or more of at least one set $\overline{q}_0$ of periodic CSI-RS resource configuration indexes by failureDetectionResources (in RRC RadioLinkMonitoringConfig 1E) or beamFailureDetectionResourceList; at least one set $\overline{q}_1$ of periodic CSI-RS resource configuration indexes; and at least one SS/PBCH block index by candidateBeamRSList or candidateBeamResourceList configured for radio link quality measurements on the BWP of the NE. At 203, the UE may determine that at least one predetermined index was not received from the NE.

At 205, the UE may determine at least one set $\overline{q}_0$ to include at least one periodic CSI-RS resource configuration index with at least one same value as the at least one RS index in the at least one RS set indicated by TCI-state for respective CORESETs that the UE uses for monitoring PDCCH. In some embodiments, the UE may perform this determination upon determining that the UE was not provided $\overline{q}_0$ by failureDetectionResources or beamFailureDetectionResourceList for a BWP of the NE. In various embodiments, if there are two RS indexes in a TCI state, the set $\overline{q}_0$ may include at least one RS index with QCL-TypeD configuration for at least one corresponding TCI state. The UE may expect the at least one set $\overline{q}_0$ to comprise up to two RS indexes, and may expect a single port RS in the set $\overline{q}_0$. In various embodiments, SS/PBCH block (SSB) and/or CSI-RS indices may be used for failure detection (beam failure detection and/or radio link monitoring); for example, failure detection resources may include both resource types or only single resource type (SSB/CSI-RS).

In various embodiments, if the UE does not receive set $\overline{q}_0$ byfailureDetectionResources or beamFailureDetectionResourceList for a BWP of the NE, and the UE is configured with CORESETPoolIndex, the UE may include into set $\overline{q}_0$ one or more of at least one periodic CSI-RS resource index, indicated by at least one TCI state; and at least one indication of at least one RS index by the TCI state for at least one CORESET respective with at least one QCL source RS indicating at least one PCI value other than the PCI of the serving cell with active DL BWP.

In various embodiments, the UE may include into set $\overline{q}_0$ one or more of at least one failure detection resource index, indicated by at least one TCI state; for at least one CORESET respective with at least one QCL source RS indicating at least one PCI value other than the PCI of the serving cell with active DL BWP. In various embodiments, the UE may determine to include into the set of $\overline{q}_0$ at least one BFD-RS per each TRP or per each cell configured for multi-TRP communication (e.g., CORESETPoolIndex or the CORESETs are associated with a cell other than a serving cell). In various embodiments, the UE may determine to include into the set of $\overline{q}_0$ at least one BFD-RS per each cell configured for multi-TRP communication. In various embodiments, in addition or alternatively, to determine if a CORESETPoolIndex (or CORESET(s)) is associated with at least one CORESET of a non-serving cell (or a cell other than current serving cell), the indication may be provided in the CORESETPoolIndex configuration or in the CORESET configuration or determined by the RS indicated by the active TCI State (either via RS configuration or the QCL source of the RS).

In various embodiments, the UE may include into set $\overline{q}_0$ one or more of at least one failure detection resource index, indicated by at least one TCI state; for at least one CORESET indicating that the CORESET is received from another cell other than the current serving cell. As an example, the serving cell may refer to the cell index or physical cell index of the cell with currently active BWP. Another cell, the non-serving cell, the adjacent cell, the neighbour cell, and/or the cell participating to inter-cell m-TRP may be configured to serve UE 120 using the serving cell configuration. For example, the serving cell configuration (e.g., pdcch-config) may include at least one parameter or configuration for receiving data/control from the non-serving cell, which may be referred as inter-cell multi-TRP. In some embodiments, the configuration may be specific for the inter-cell multi-TRP and/or may not be part of the serving cell configuration, although it may be provided by the serving cell.

In various embodiments, the multi-TRP operation, intra-cell, and/or inter-cell may be referenced using the CORESETPoolIndex. In some examples, the CORESETs with same CORESETPoolIndex values may be considered by the UE to be transmitted from the same TRP. For example, if the UE has more than one different CORESETPoolIndex value configured, then the UE may be configured with multi-TRP communication. Additionally or alternatively, CORESETs associated with CORESETPoolIndex may be further associated to another-cell/non-serving cell, such as a cell not configured as serving cell, to facilitate inter-cell M-TRP. An association may be indicated explicitly that CORESETs within a pool are associated to a specific cell, for example, the adjacent cell. In various examples, in the CORESETPoolIndex configuration, the index may be associated with a PCI or other identifier configured for the same purpose.

In various embodiments, determining that the CORESET and/or an RS indicated by the TCI state is transmitted from another cell (or from the non-serving cell participating to multi-TRP transmission/reception) and/or that the UE is configured with at least one inter-cell M-TRP may based upon one or more of:

- the QCL source of the indicated RS by at least one TCI state may be configured to be transmitted from cell other than the current serving cell. For example, if the source RS is SSB/CSI-RS, the NE may configure at least one SSB index to be associated with at least one cell identifier, such as PCI
- at least one CORESET may be transmitted from another cell RS, such as where the CORESET has at least one indication, such PCI, or is associated with any signal configured to be transmitted from other cell, is, such as through configuration, associated with at least one other cell. For example, at least one PDCCH and/or PDSCH reception may be configured from at least one other cell with at least one PCI value other than the PCI of the serving cell with at least one active DL BWP
- at least one entry in the TCI state list and/or at least one activated TCI state may be associated with at least one non-serving cell.
- Any indication that PDCCH configuration (including CORESET configuration) or reference signal configuration or PDCCH reception is from a cell other than current serving cell. For example, an explicit indication may be provided as part of the configuration.

In some embodiments, the at least one another cell/neighbour cell/adjacent cell/non-serving cell and/or at least one cell participating in at least one serving cell for the UE. For example, at least one configuration may be a special configuration, where the UE may receive at least one indication that the NE may not be a secondary cell (SCell), but instead configured for multi-TRP. In various embodiments, at least one inter cell m-TRP cell may be an SCell.

In some embodiments, if the UE is not provided $\overline{q}_0$ by failureDetectionResources or beamFailureDetectionResourceList for a BWP of the NE, and the UE is configured with CORESETPoolIndex, for each CORESETPoolIndex, the UE may include into set $\overline{q}_0$ at least one periodic CSI-RS resource index, indicated by the TCI state for at least one respective CORESET associated with CORESETPoolIndex. In certain embodiments, when the UE is configured with more than one CORESETPoolIndex, the UE may not include into set $\overline{q}_0$ more than 'N_lr_max-1' RSs indicated by the TCI state for the CORESETs for the respective CORESETPoolIndex.

In various embodiments, the UE may not include into set $q_0$ more than 'N_lr_max−1' RSs indicated by the TCI state for the CORESETs for the respective CORESETPoolIndex where N_lr_max may refer to a maximum number of failure detection resources per TRPICORESETPoolIndex or BWP.

In certain embodiments, for inter-cell operations when the set of $q_0$ cannot accommodate all the RS corresponding to the active TCI states for PDCCH, the UE may select at least one resource to be included in the set of $q_0$ so that the QCL source of different RS QCL info with the same PCI with each other.

In some embodiments, for each CORESETPoolIndex, the UE may include into set $q_0$ at least one failure detection resource, indicated by the TCI state for at least one respective CORESET associated with CORESETPoolIndex. As an example, if the UE is configured with m-TRP communication (e.g., with more than one TRP/CORESETPoolIndex value), the UE may determine whether to include at least one RS indicated by the active TCI for the CORESET for each respective CORESETPoolIndex. As an example, the UE may include at least one failure detection resource for each TRP.

In various embodiments, the UE may be configured to determine whether to include at least one RS index to the failure detection resource set based on the active TCI state for a CORESET that is associated with a specific CORESETPoolIndex value, such as '1', or alternatively, with a value '0'. For example, the UE may be configured to select at least one BFD-RS indicated by the TCI states for CORESETs in CORESETPoolIndex '1' (or a value that may be referred to as "secondary CORESETPoolIndex, or inter-cell CORESETPoolIndex value if considered that CORESETPoolIndex value '0' refers to primary TRP or the serving cell TRP) and determine the remaining BFD-RS based on the TCI states for CORESETs in pool value '0'. Up to a maximum number of BFD-RS of the BFD-RS may be selected from RS associated with CORESETPoolIndex '0' or '1', or vice versa. Alternatively, the UE may select one or at least one for CORESETPoolIndex values other than '0' or other pre-determined value (e.g. '1'. However, the values '0' and '1' are only used as example, and any values may be used. Furthermore, more than 2 index values may also be used.

In some embodiments, the CORESETPoolIndex value associated with CORESET index 0 may be considered a "primary" CORESETPoolIndex or a CORESETPoolIndex used for selecting BFD-RS when at least one BFD-RS is selected per TRP/CORESETPoolIndex, such as where the UE selects the rest from the RS indicated by TCI states that are associated with CORESETs of CORESETPoolIndex value '0'. Alternatively, the CORESETPoolIndex value may be selected based upon a primary or higher priority, or based on the BFD-RS selection, where the CORESETPoolIndex may be associated with control resource set zero (CORESET #0). Furthermore, the "primary" CORESETPoolIndex value may be any of the CORESETPoolIndex values that may be configured for the UE.

In various embodiments, thresholds $Q_{out,LR}$ and $Q_{in,LR}$ may correspond to various default values of, as described in 3GPP TS 38.133, rlmInSyncOutOfSyncThreshold for $Q_{out}$, and to the values provided by rsrp-ThresholdSSB or rsrp-ThresholdSSBBFR, respectively. The physical layer in the UE may assess the radio link quality according to the set $q_0$ of resource configurations against the threshold $Q_{out,LR}$. For set $q_0$, the UE may assess the radio link quality only according to periodic CSI-RS resource configurations, or SS/PBCH blocks on the PCell or the PSCell, that are quasi co-located, with the DMRS of PDCCH receptions monitored by the UE. The UE may apply threshold $Q_{in,LR}$ to at least one L1-RSRP measurement obtained from at least one SS/PBCH block. Additionally or alternatively, the UE may apply threshold $Q_{in,LR}$ to at least one L1-RSRP measurement obtained for at least one CSI-RS resource after scaling a respective CSI-RS reception power with a value provided by powerControlOffsetSS.

In various embodiments, where multiple rules are defined, when selecting BFD-RS, the UE may use at least one rule configured by the NE, and/or at least one rule selected by the UE. Furthermore, these configuration rules may be signaled to the UE, for example, using RRC signalling. At 207, the UE may perform at least one beam failure detection procedure.

FIG. 3 illustrates a system according to certain embodiments. It should be understood is that each signal or block in FIGS. 1-2 may be implemented by various means or their combinations, such as hardware, software, firmware, one or more processors and/or circuitry. In one embodiment, a system may include several devices, such as, for example, user equipment 310 and/or network entity 320. The system may include more than one user equipment 310 and more than one network entity 320.

User equipment 314 may be a mobile station (MS) such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

Network entity 320 may be a CBSD, a base station, an access point, an access node, an eNB, a gNB, a server, a host, a MME, a S-GW, a P-GW, a PCRF, a P-CSCF, E/CSCF, or any other network entity that may communicate with user equipment 310.

Each of these devices may include at least one processor or control unit or module, respectively indicated as 311 and 321. At least one memory may be provided in each device, and indicated as 312 and 322, respectively. The memory may include computer program instructions or computer code contained therein. One or more transceivers 313 and 323 may be provided, and each device may also include an antenna, respectively illustrated as 314 and 324. Although only one antenna each is shown, many antennas and multiple antenna elements may be provided to each of the devices. Other configurations of these devices, for example, may be provided. For example, user equipment 310 and/or network entity 320 may be additionally configured for wired communication, in addition to wireless communication, and in such a case, antennas 314 and 324 may illustrate any form of communication hardware, without being limited to merely an antenna.

Transceivers 313 and 323 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

In some embodiments, an apparatus, such as a user equipment or a network node, may include means for carrying out embodiments described above in relation to FIGS. 1-2. In certain embodiments, at least one memory including computer program code can be configured to, with the at least one processor, cause the apparatus at least to perform any of the processes described herein.

Processors 311 and 321 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 312 and 322 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be is processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as user equipment 310 and/or network entity 320, to perform any of the processes described above (see, for example, FIGS. 1-2). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 3 illustrates a system including a user equipment 310 and/or network entity 320, certain embodiments may be applicable to other configurations, and configurations involving additional elements, as illustrated and discussed herein. For example, multiple user equipment devices and multiple base stations may be present, or other nodes providing similar functionality, such as nodes that combine the functionality of a user equipment and a base station, such as a relay node. User equipment 310 may likewise be provided with a variety of configurations for communication other than communicating with network entity 320. For example, user equipment 310 may be configured for device-to-device, machine-to-machine, or vehicle-to-vehicle communication.

As shown in FIG. 3, transceivers 313 and 323 may be provided, and one or more devices may also include at least one antenna, respectively illustrated as 314 and 324. The device may have many antennas, such as an array of antennas configured for multiple input multiple output (MIMO) communications, or multiple antennas for multiple radio access technologies. Other configurations of these devices, for example, may be provided.

Transceivers 313 and 323 may be a transmitter, a receiver, or both a transmitter and a receiver, or a unit or device that may be configured both for transmission and reception.

Processors 311 and 321 may be embodied by any computational or data processing device, such as a central processing unit (CPU), application specific integrated circuit (ASIC), or comparable device. The processors may be implemented as a single controller, or a plurality of controllers or processors.

Memories 312 and 322 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 1-2). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-2. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Figure 4:
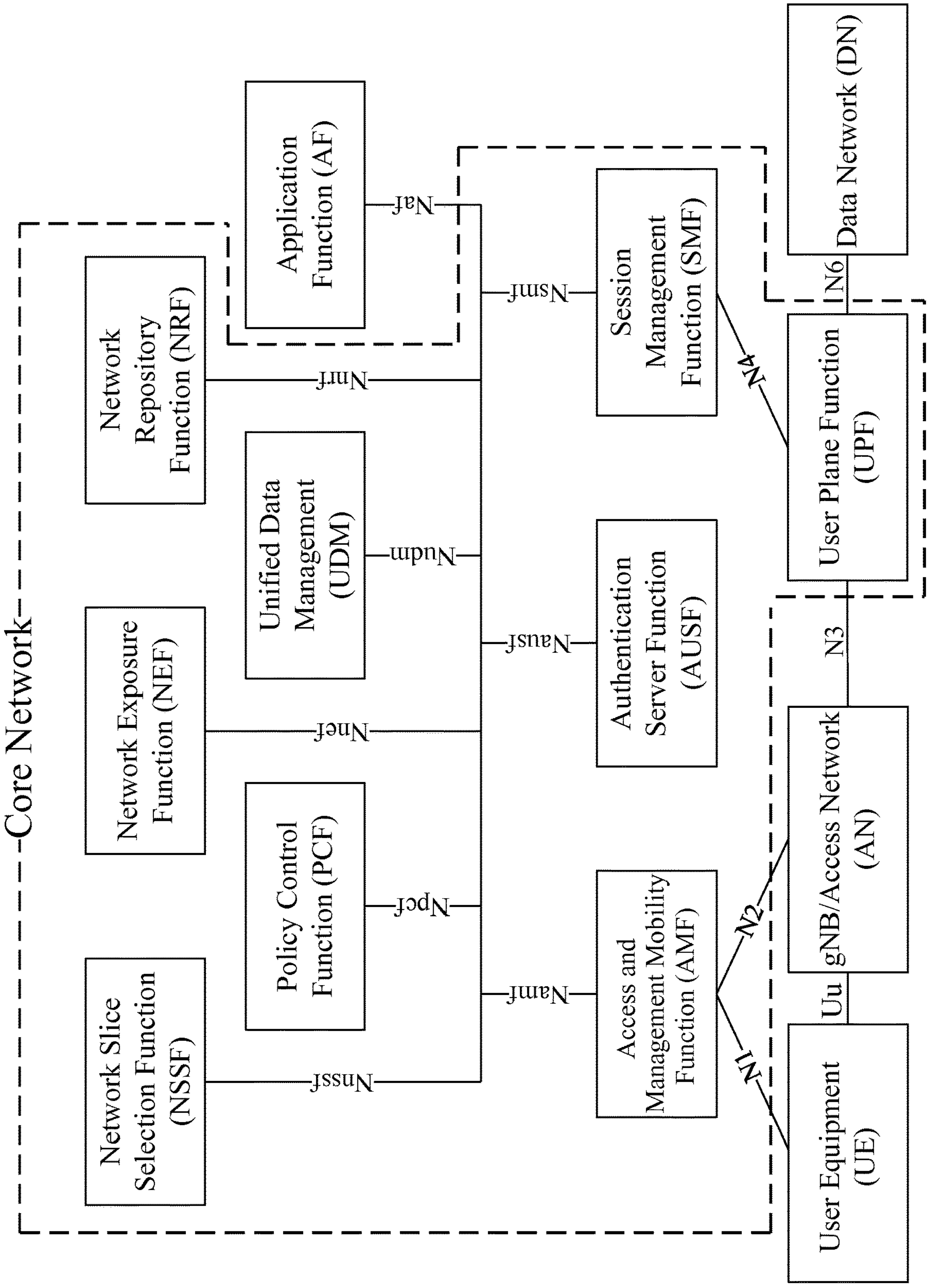
FIG. 4 illustrates an example of a 5G network and system architecture according to certain embodiments.

FIG. 4 illustrates an example of a 5G network and system architecture according to certain embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 9 may be similar to NE 810 and UE 820, respectively. The UPF may provide services such as intra-RAT and inter-RAT mobility, routing and forwarding of data packets, inspection of packets, user plane QoS processing, buffering of downlink packets, and/or triggering of downlink data notifications. The AF may primarily interface with the core network to facilitate application usage of traffic routing and interact with the policy framework.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

3GPP Third Generation Partnership Project
5G Fifth Generation
5GC Fifth Generation Core
5GS Fifth Generation System
5QI Fifth Generation Quality of Service Indicator
ASIC Application Specific Integrated Circuit
BFD-RS Beam Failure Detection Reference Signal
BS Base Station
CORESET Control Resource Set
CORESET #0 Control Resource Set Zero
CPU Central Processing Unit
CSI-RS Channel State Information Reference Signal
DCCH Dedicated Control Channel
DMRS Demodulation Reference Signal
DCI Downlink Control Information
DL Downlink
eMBB Enhanced Mobile Broadband
eNB Evolved Node B
EPS Evolved Packet System
gNB Next Generation Node B
GPS Global Positioning System
HDD Hard Disk Drive
HST High Speed Train
IoT Internet of Things
LTE Long-Term Evolution
MAC Medium Access Control MCS Modulation and Coding Scheme
MEMS Micro Electrical Mechanical System
MIMO Multiple Input Multiple Output
M-TRP Multi Transmission Reception Point
NAS Non-Access Stratum
NE Network Entity
NG Next Generation
NR New Radio
NR-U New Radio Unlicensed
PDA Personal Digital Assistance
PDCCH Physical Downlink Control Channel
PDSCH Physical Downlink Shared Channel
PUCCH Physical Uplink Control Channel
PUSCH Physical Uplink Shared Channel
QCL Quasi Co-Location
RAM Random Access Memory
RAN Radio Access Network
RAT Radio Access Technology
RRC Radio Resource Control
RSRP Reference Signal Received Power
SSB Synchronization Signal/Physical Broadcast Channel Block
SS/PBCH Synchronization Signal/Physical Broadcast Channel
SFN System Frame Number
SRB Signaling Radio Bearer
TB Transport Block
TCI Transmission Configuration Indication
TR Technical Report
TRP Transmission Reception Point
TRS Tracking Reference Signal
TS Technical Specification
UE User Equipment
UL Uplink
UMTS Universal Mobile Telecommunications System
URLLC Ultra-Reliable and Low-Latency Communication
UTRAN Universal Mobile Telecommunications System Terrestrial Radio
Access Network
WI Work Item
WLAN Wireless Local Area Network

The invention claimed is:

1. An apparatus, comprising:

at least one processor; and at least one memory including computer program code, the at least one memory and the computer program code being configured to, with the at least one processor, cause the apparatus at least to:

receive at least one set of periodic channel state information reference signal resource configuration indexes for failure detection from at least one network entity;

upon determining at least one set of periodic channel state information reference signal resource configuration indexes for failure detection has not been received, determine at least one set of failure detection resources to include at least one periodic channel state information reference signal resource configuration index with at least one same value as at least one reference signal index in at least one reference signal set indicated by a transmission configuration indication state for respective control resource sets used by the user equipment for monitoring physical downlink control channels; and including into the at least one set at least one failure detection resource index which is indicated by at least one transmission configuration indication state for at least one respective control resource set with at least one quasi colocation source reference signal indicating at least one physical cell identifier value other than the physical cell identifier of a serving cell with at least one active downlink bandwidth part.

2. The apparatus of claim 1, wherein the at least one memory and the computer program code are further configured to, with the at least one processor, cause the apparatus at least to:

determine at least one predetermined index that has not been received.

3. The apparatus of claim 1, wherein the determining is performed if the at least one predetermined index does not comprise failureDetectionResources or beamFailureDetectionResourceList.

4. The apparatus of claim 1, wherein the received at least one set of periodic channel state information reference signal resource configuration indexes is associated with at least one of candidateBeamRS List and candidateBeamResourceList.

5. The apparatus of claim 2, wherein the at least one set of failure detection resources are associated with one or more of at least one of synchronization signal block and the at least one set of channel state information reference signal resource configuration indexes.

6. The apparatus of claim 1, wherein the at least one predetermined index is associated with at least one of failureDetectionResources and beamFailureDetectionResourceList.

7. The apparatus of claim 1, wherein no more than a predetermined number of reference signals indicated by the transmission configuration indication state for the respective control resource sets for the respective higher layer parameter are included in the determined at least one set of periodic channel state information reference signal resource configuration indexes when more than one higher layer parameter is configured.

8. The apparatus of claim 1, wherein the at least one memory and the computer program code are further configured to, with the at least one processor, cause the apparatus at least to:

identify at least one failure detection resource based on control resource set priority information.

9. The apparatus of claim 1, wherein the at least one memory and the computer program code are further configured to, with the at least one processor, cause the apparatus at least to:

based on the respective control resource set configuration information, determine whether to include an associated resource index with the at least one set of failure detection resources based on the respective control resource set configuration information.

10. The apparatus of claim 1, wherein, when the apparatus is configured with more than one higher layer parameter, the apparatus is configured to not include into a set of q0 more than N_lr_max−1 reference signals indicated by the transmission configuration indication state for the at least one control resource set for the respective higher layer parameter, where the set of q0 comprises at least one failure detection resource and where N_lr_max refers to a maximum number of failure detection resources per TRP or CORESETpoolIndex or BWP.

11. The apparatus of claim 1, wherein the respective CORESET is associated with CORESETPoolIndex.

12. The apparatus of claim 11, wherein the CORESETpoolindex is associated with a cell other than serving cell that is determined based on at least the one quasi-colocation source reference signal indicated by the TCI state for at least the respective CORESET.

13. The apparatus of claim 1, wherein the at least one set of failure detection resource comprises at least one failure detection resource index determined based at least in part on the higher layer parameter associated with the at least one respective control resource set.

14. The apparatus of claim 1, wherein the at least one set of failure detection resources is associated with at least one cell other than the serving cell.

15. A method for a user equipment, comprising:

receiving at least one set of periodic channel state information reference signal resource configuration indexes for failure detection from at least one network entity;

upon determining at least one set of periodic channel state information reference signal resource configuration indexes for failure detection has not been received, determining at least one set of failure detection resources to include at least one periodic channel state information reference signal resource configuration index with at least one same value as at least one reference signal index in at least one reference signal set indicated by a transmission configuration indication state for respective control resource sets used by the user equipment for monitoring physical downlink control channels; and including into the at least one set at least one failure detection resource index which is indicated by at least one transmission configuration indication state for at least one respective control resource set with at least one quasi colocation source reference signal indicating at least one physical cell identifier value other than the physical cell identifier of a serving cell with at least one active downlink bandwidth part.

16. A non-transitory computer-readable medium comprising program instructions stored thereon, which when executed, cause an apparatus at least to:

receive at least one set of periodic channel state information reference signal resource configuration indexes for failure detection from at least one network entity;

upon determining at least one set of periodic channel state information reference signal resource configuration indexes for failure detection has not been received, determine at least one set of failure detection resources to include at least one periodic channel state information reference signal resource configuration index with at least one same value as at least one reference signal index in at least one reference signal set indicated by a transmission configuration indication state for respective control resource sets used by the user equipment for monitoring physical downlink control channels; and including into the at least one set at least one failure detection resource index which is indicated by at least one transmission configuration indication state for at least one respective control resource set with at least one quasi colocation source reference signal indicating at least one physical cell identifier value other than the physical cell identifier of a serving cell with at least one active downlink bandwidth.

* * * * *